June 21, 1960 M. S. BILSBACK 2,941,741

TAPE CARTRIDGE AND TAPE LOADING MECHANISM

Filed June 30, 1958 7 Sheets-Sheet 1

INVENTOR.
MALVIN S. BILSBACK

BY [signature]

ATTORNEY

June 21, 1960 M. S. BILSBACK 2,941,741

TAPE CARTRIDGE AND TAPE LOADING MECHANISM

Filed June 30, 1958 7 Sheets-Sheet 5

June 21, 1960 M. S. BILSBACK 2,941,741

TAPE CARTRIDGE AND TAPE LOADING MECHANISM

Filed June 30, 1958

7 Sheets-Sheet 6

June 21, 1960 M. S. BILSBACK 2,941,741

TAPE CARTRIDGE AND TAPE LOADING MECHANISM

Filed June 30, 1958 7 Sheets-Sheet 7

United States Patent Office 2,941,741

Patented June 21, 1960

2,941,741

TAPE CARTRIDGE AND TAPE LOADING MECHANISM

Malvin S. Bilsback, Poughkeepsie, N.Y., assignor to International Business Machines Corporation, New York, N.Y., a corporation of New York Filed June 30, 1958, Ser. No. 745,698

13 Claims. (Cl. 242—55.13)

This invention relates to tape reel cartridges, and more particularly to a tape reel cartridge adapted for mechanical manipulation in an automatic tape processing system.

In the copending application of Thomas U. Burke et al., Serial No. 741,543, filed June 12, 1958, there is disclosed a machine capable of loading reels of record tape into operative position upon the reel driving spindles of tape transport mechanism utilized in tape processing systems, and then, after the tape has been processed, removing the tape reels from the reel driving spindles and making such removed reels available for return to reel storage locations.

A change of tape reels on transport mechanism of the type shown in James A. Weidenhammer et al. United States Patent 2,792,217 requires about a half a minute, and since the time required to process a reel of tape at processing speeds heretofore employed has been in excess of five minutes, the tape loading time has been of comparatively little consequence. However, with the advent of higher tape processing speeds, the time required to supply tape to the tape transport unit becomes an important consideration if maximum utility of the system is to be realized.

Record tape reels are presently stored in receptacles in the form of metal "cans," which are not adapted to automatic manipulation but which must be opened and from which the reel must be removed before it can be placed on the drive spindle of a tape transport. This operation is not only time consuming, but also has the more serious consequence that the tape is repeatedly exposed to the atmosphere, to damaging particles of dirt and dust in the atmosphere, and to the hazard of damage to both reel and tape as a result of manual handling. These latter considerations indicate the desirability of a system adapted to manipulate and process tape on reels housed in a capsule or cartridge so constructed that the cartridge can be loaded on the spindles of a tape transport and the reels within the cartridge can be driven by the tape transport spindles and run free in the cartridge. Use of a cartridge, as suggested, will eliminate the time required to remove new reels of tape from and return processed reels of tape to the reel package now employed. By the same token, also eliminated will be the time required to thread a new tape across the tape transport unit and attach it to the empty reel. Of even greater importance is the fact that a permanent tape reel package or cartridge will provide complete protection for the tape in storage, transport and processing.

It is, therefore, the object of this invention to provide a tape reel cartridge which will constitute a more or less permanent protective covering for the tape reels therein, and which is adapted to automatic manipulation within a tape reel storage and processing system such as that disclosed in the aforesaid copending application for United States patent.

The nature of the invention can be more fully understood by reading the following specification, which is illuminated by the drawings forming a part hereof, in which drawings like reference numerals indicate like parts, and in which.

Figure 1:
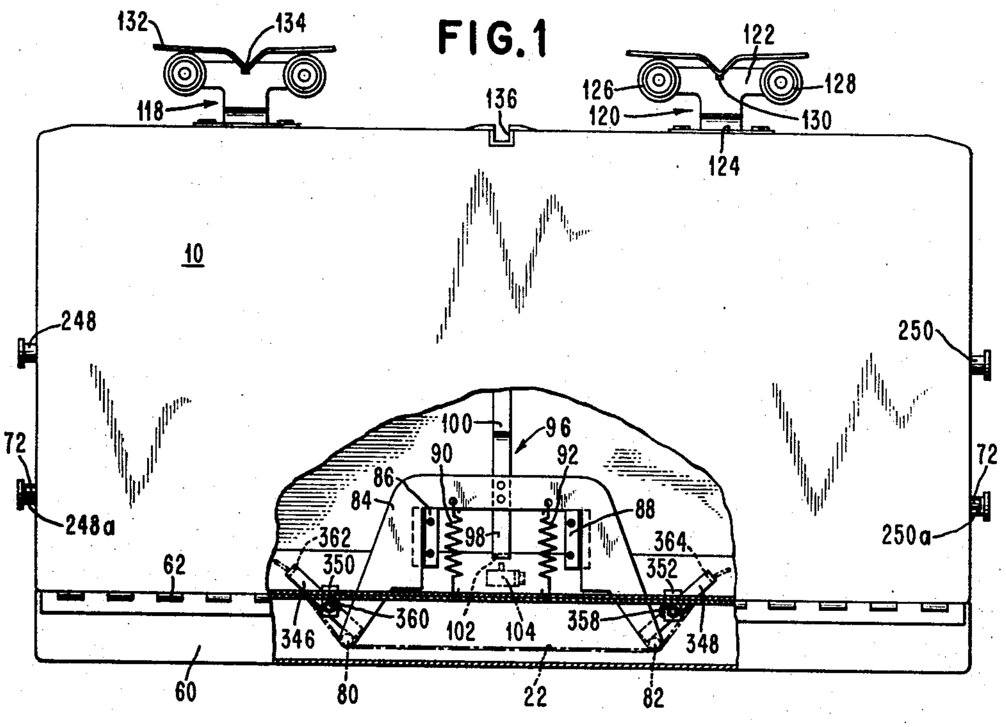
Fig. 1 is a back elevational view of the cartridge taken on lines 1—1 of Fig. 3, parts of the cartridge wall being broken away to show underlying structure.
Figure 2:
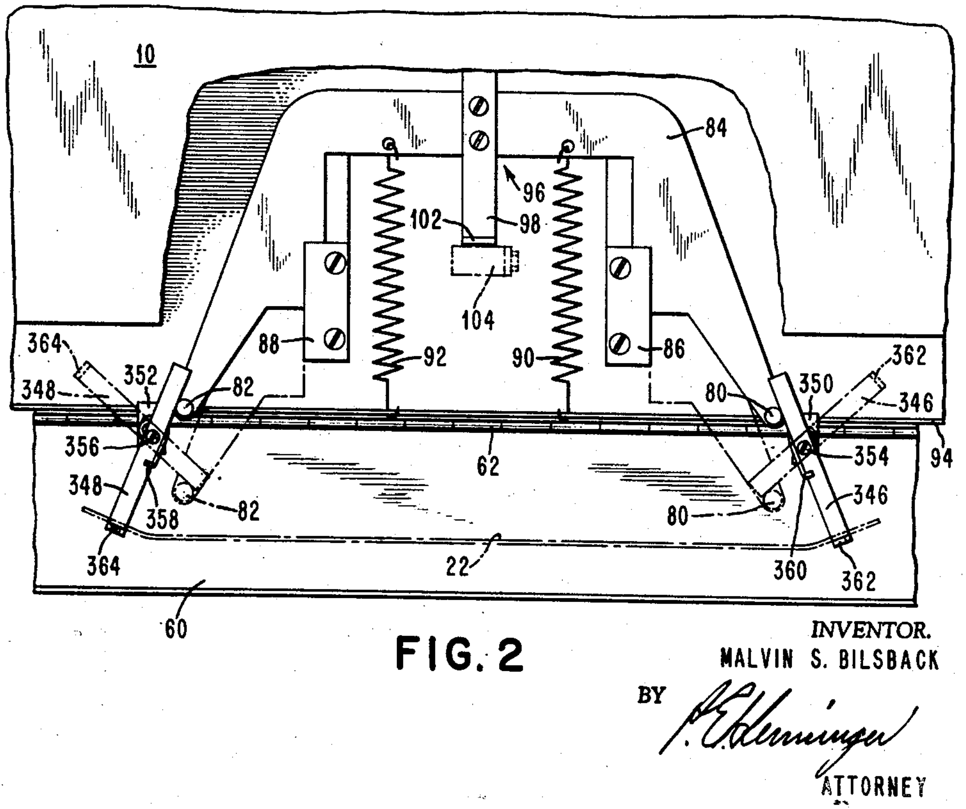
Fig. 2 is a partial view of the cartridge in front elevation, taken on lines 2—2 of Fig. 3, part of the cartridge wall being broken away to show underlying structure.
Figure 3:
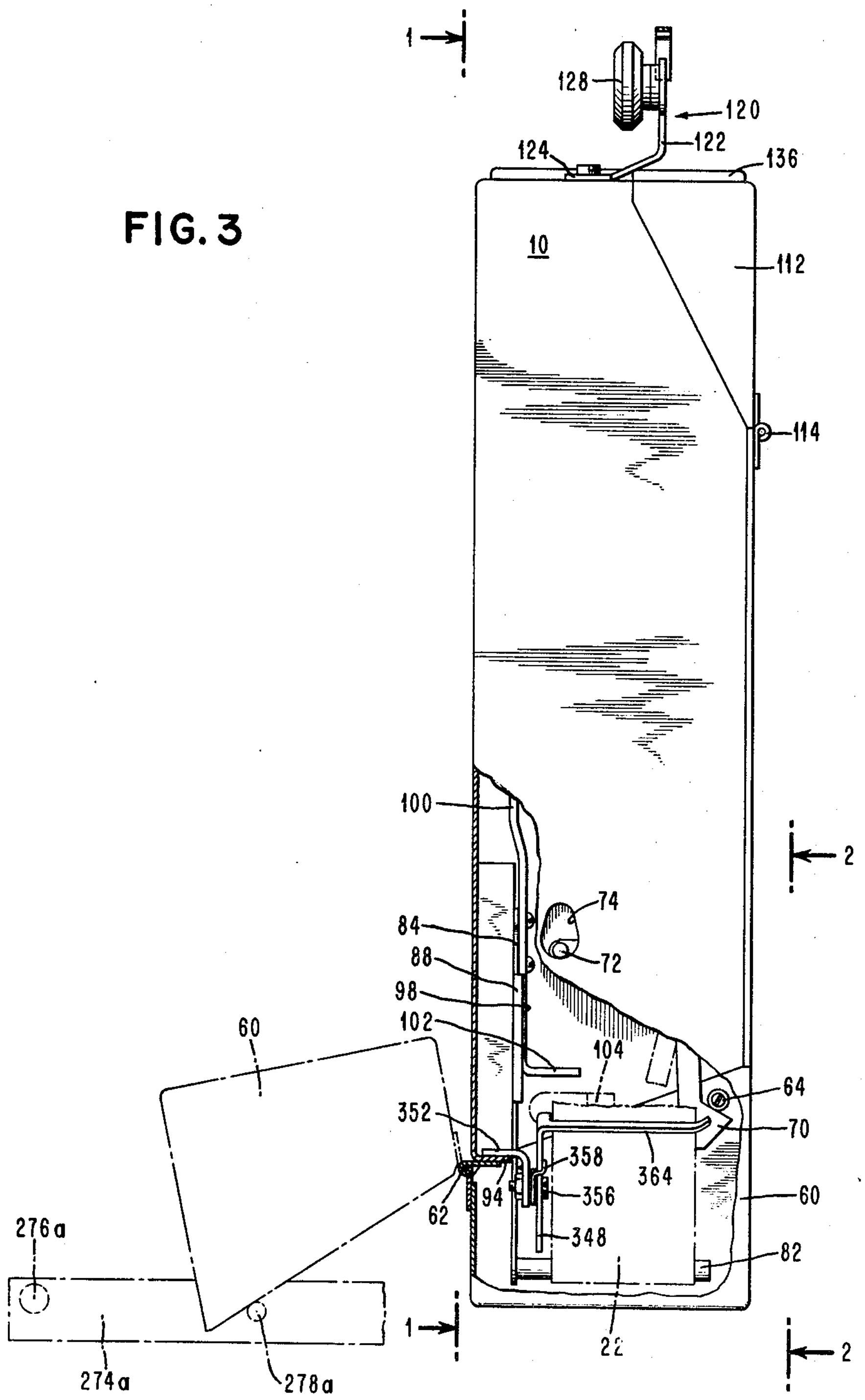
Fig. 3 is a side elevational view of the cartridge, part of the side wall being broken away to show underlying structure.
Figure 4:
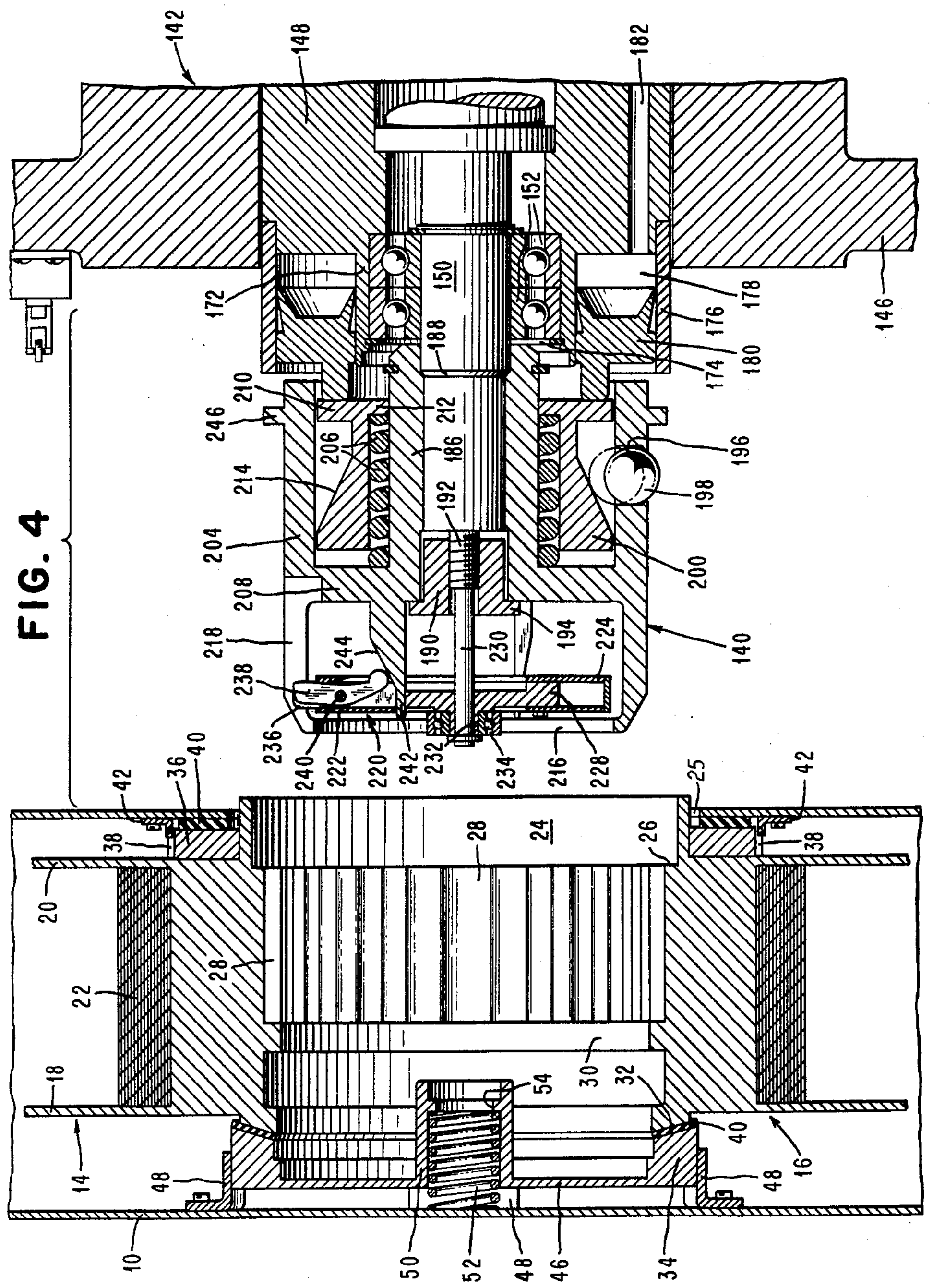
Fig. 4 is an axial, sectional view through the hub portion of a tape reel enclosed within a cartridge located in alignment with a reel drive spindle, also shown in section.

The nature of the tape reel cartridge can be ascertained by reference to Figs. 1, 2 and 3. Fig. 4 shows a tape reel cartridge 10 disposed in operative relationship with certain reel driving and tape processing mechanism of a tape transport unit which will be explained in greater detail at a point hereinafter. As shown in Figs. 1 through 4, and particularly in Fig. 8, the cartridge 10 is a relatively flat rectangular casing adapted to hold a pair of tape reels 12 and 14.

As shown in Fig. 4, the reels adapted for the cartridge 10 include a hub portion 16 from which extend a pair of radial webs 18 and 20 between which a coil of record tape 22 may be reeled. The hub 16 includes an annular flange 24 which is adapted to extend through a hub aperture 25 in one of the side walls of the cartridge 10. Inwardly of the flange 24 is a shoulder 26 which is adapted to cooperate with a portion of a tape reel drive spindle when the cartridge is positioned on a tape transport unit. The hub 16 has internal flutes 28 defined at one end by an annular ridge 30. The outer face of the hub 16 has a surface 32 with which is engaged a reel retainer 34. Surrounding the annular flange 24 and fixed to the hub 16 is an annular gear 36 having uniformly spaced teeth 38 about the periphery thereof. Fixed to the inner wall of the cartridge 10 is a friction annulus 40 against which the outer face of the annular gear 36 is adapted to rest. Extending inwardly from the inner face of the cartridge wall is a plurality of L-shaped lugs 42 which are so positioned as to enter between a pair of teeth 38 of the annular gear 36 when the reel is seated in the cartridge with the annular flange 24 thereof extending through the hub aperture 25 in the cartridge wall. The position of the reel is maintained in the cartridge 10 by the reel retainer 34 which is in the form of a disk 46 guided for axial movement on a plurality of guide flanges 48. The axis of the disk is formed as a hollow inwardly projecting hub 50 adapted to receive a compression spring 52. The compression spring bears at one end against a collar 54 formed on the inside of the inwardly projecting hub 50 and at the other end against the adjacent wall of the cartridge 10. The spring tends to press the disk 46 inwardly such that a clamping face 56 will engage the surface 32 of the reel hub. By this means the reel is maintained against movement within the cartridge 10. The manner in which the hub of the reel cooperates with a reel driving spindle of the tape transport will be fully explained at a later point.

Figure 6:
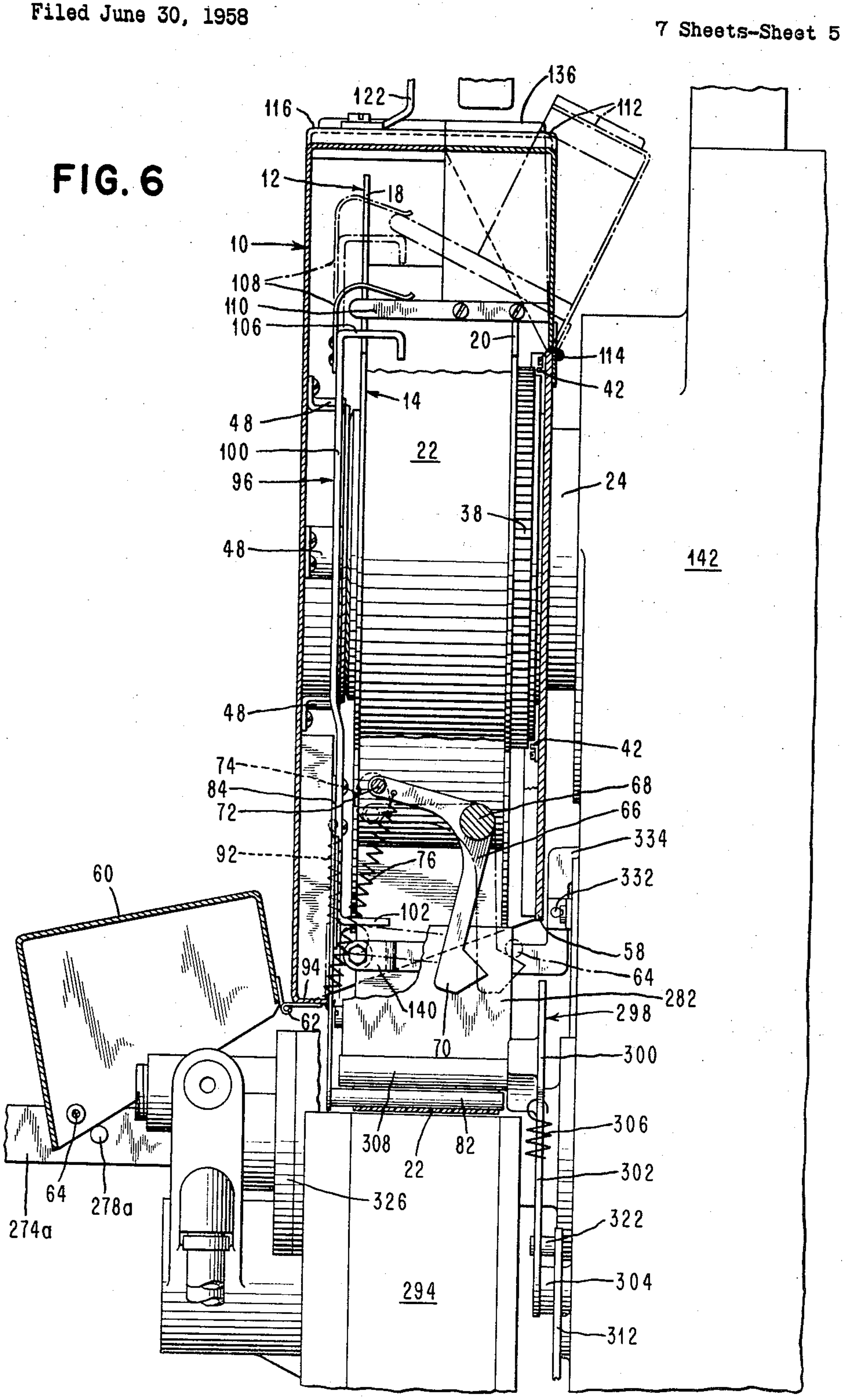
Fig. 6 is a sectional view on lines 6—6 of Fig. 7.

Further reference to Figs. 3 and 6 will show that the cartridge 10 has an open bottom 58 with which cooperates a closure section 60 adapted to swing about a transverse hinge 62. The open bottom of the cartridge provides access for the tape reels 12 and 14 and also access to the tape running between the reels 12 and 14 when the cartridge is associated with a tape transport unit, as will be described hereinafter. The closure section 60 has an inwardly extending stud 64 at each end thereof, each respectively adapted to be engaged by a latch member.

Fig. 6 shows one latch member 66 and since both latch members are identical, an understanding of the latch member of Fig. 6 will serve as an understanding of both. The latch member 66 is adapted to rotate about a pivot pin 68 such that a lower hooked end 70 may be swung into interposing relationship with the stud 64. The latch member 66 is in the form of an inverted L and has at its upper end a pin 72 which extends laterally through an elongated aperture 74 formed in the end wall of the cartridge 10. A spring 76 normally biases the latch member 66 about its pivot pin 68 in a counterclockwise direction, so that the latch member 66 tends to engage the stud 64. When the closure section 60 is open, as shown in Figs. 3 and 6, rotation thereof about its hinge 62 and into its cartridge closing position results in the camming of the latch member 66 in a clockwise direction by reason of contact between the stud 64 and a camming surface 78 on the latch member. The manner in which the latch member 66 is automatically operated to release the closure member 60 will be developed in greater detail at a point hereinafter.

When a pair of reels 12 and 14 is positioned in the cartridge 10, the record tape 22 extending between the two reels is engaged at spaced points by tape guide pins 80 and 82, as in Figs. 1 and 2. These pins extend laterally from the free end of an inverted generally U-shaped yoke 84, which is mounted on an inner wall of the cartridge for limited movement in a vertical direction. As best seen in Fig. 2, the yoke 84 is mounted to slide in a vertical direction by a pair of guide members 86 and 88. Downward movement of the yoke is limited by engagement thereof with the upper ends of the guide members 86 and 88. The yoke is normally biased into its lower position by means of a pair of springs 90 and 92 which are connected between the yoke 84 and an inturned flange 94 of the cartridge, as best shown in Fig. 2. The tape guide pins 80 and 82, therefore, maintain a length of the tape 22 in such position that it registers with the gap between a pair of read/write heads and a tape guide, which is to be explained in greater detail hereinafter.

Attached to the yoke 84 is a bar 96 (see also Fig. 7) which has a foot 98 extending downwardly from the point at which it is attached to the yoke 84, and a relatively longer stem 100 which extends upwardly from the point of attachment. The downwardly extending foot 98 of the bar has an inturned finger 102 (Fig. 6) which is engaged by an operating lever 104 carried by the frame of the tape transport mechanism. More will be said of the nature and operation of the operating lever 104 hereinafter.

As best seen in Fig. 6, the upwardly extending stem 100 of the bar 96 has an inturned end 106 and has attached thereto a spring finger 108 which overlies the inturned end 106 such that a lever 110 can be engaged between the inturned end 106 and the overlying spring finger 108. The upper wall of the casing is split to form a movable closure section 112 adapted to swing outwardly about a hinge 114. The closure section 112 has attached thereto the lever 110, such that when the bar 96 is moved upwardly, the inturned end 106 thereof will rotate the lever 110 and thereby open the closure section 112 to the dotted line position, as shown in Fig. 6. Conversely, when the bar 96 is moved downwardly, the spring finger 108 of the lever assembly will engage the upper face of the inwardly extending lever 110 and rotate the closure section 112 about its hinge 114 whereby the cartridge is closed at the top.

A fixed top wall 116 of the cartridge 10 has attached thereto a pair of dual caster assemblies 118 and 120, as best shown in Fig. 1.

As shown, the caster assemblies include a T-shaped supporting bracket 122 having a base flange 124 by which they are attached to the upper wall 116 of the reel cartridge. The head of the bracket provides a mount for a pair of caster wheels 126 and 128. The head of the bracket 122, intermediate the caster wheels 126 and 128, is provided with a notch 130 adapted to engage cartridge locating detents 132 which are located at various stop positions along the path in which the tape reel cartridges are adapted to move. The cartridge locating detent 132 is in the form of a downwardly bowed spring having formed therein a detent rib 134 which is adapted to enter the locating notch 130 of the caster assembly. The detent spring 132 intersects the path of the caster assembly bracket 122 and the same is slightly compressed as the bracket 122 passes under the spring until the notch 130 registers with the detent rib 134 at which time the spring will maintain the cartridge in its proper lateral position upon its transport track. Located at the center line of the top wall of the cartridge is a groove 136 adapted to be engaged by cartridge detenting mechanism by which the cartridge is moved along the trackway.

Figure 7:
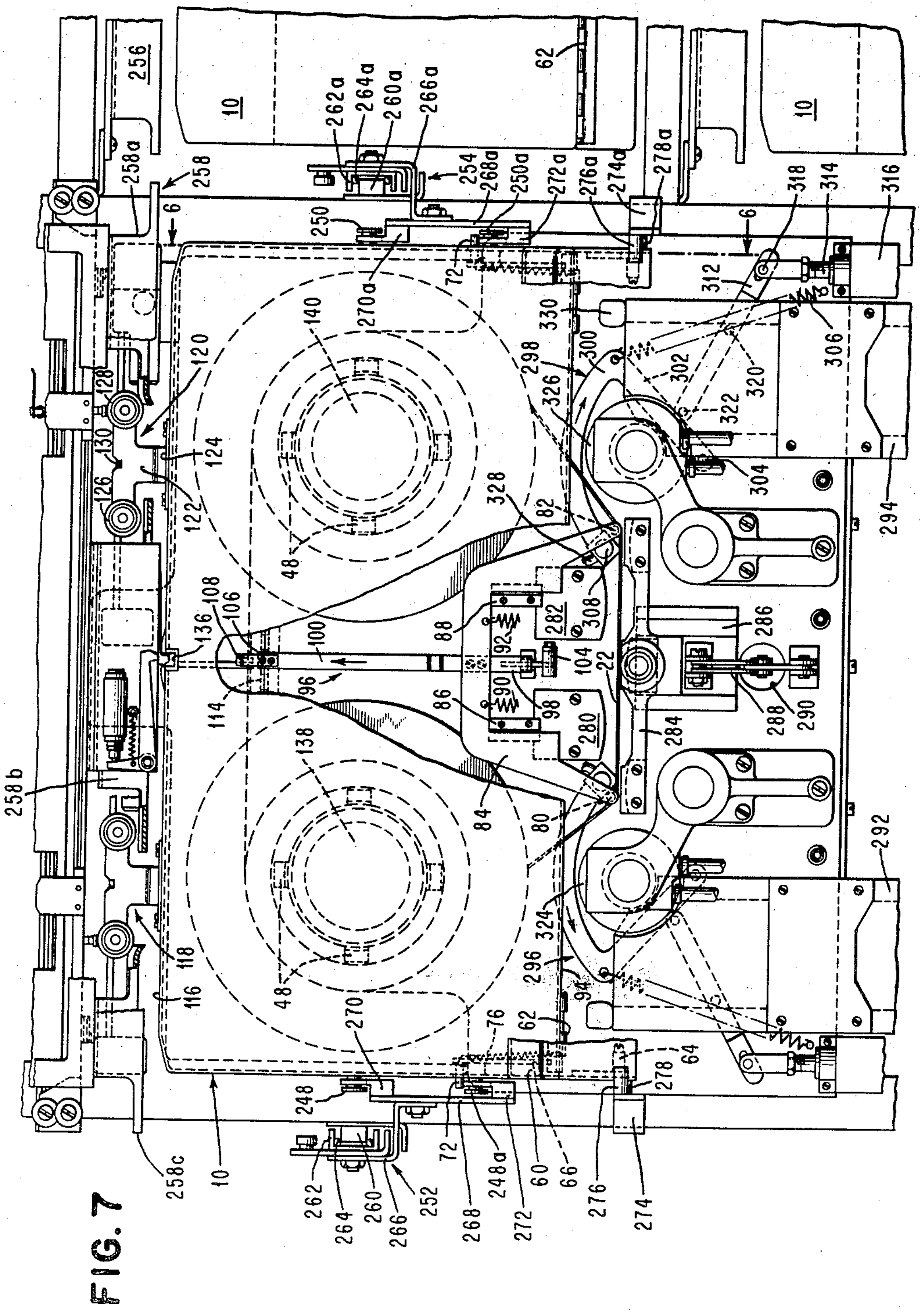
Fig. 7 is a front elevational view of a reel cartridge mounted upon the drive spindles of a tape transport unit, portions of the cartridge casing being broken away to show underlying structure.

When a cartridge 10 is positioned in front for a tape transport unit, as shown in Fig. 7, it is in a position of alignment for mounting the reels thereof on their respective drive spindles 138 and 140 of a tape transport unit 142, as shown in Fig. 6. When in the loading position of Fig. 7, the hubs of the reels are in alignment with their respective spindles, as shown in the case of the reel hub and spindle of Fig. 4.

Figure 5:
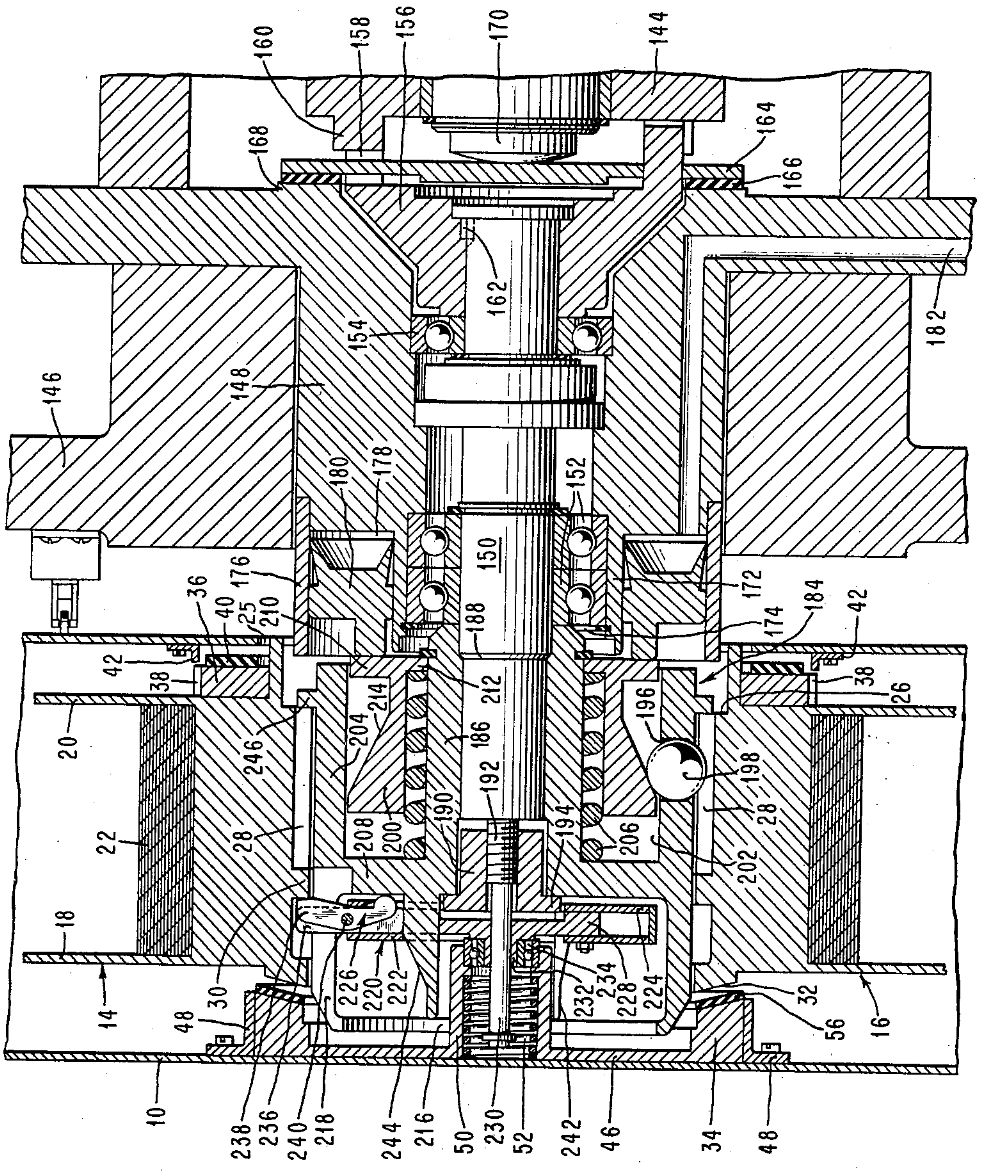
Fig. 5 is a view corresponding to Fig. 4 showing, however, the reel loaded upon the drive spindle.

The spindles, of which the spindle 140 of Figs. 4 and 5 is typical, are rotated by hydraulic motors of which a fragment 144 is shown in Fig. 5. The frame 146 of the tape transport mechanism is suitably apertured to receive a journal structure 148 in which the drive spindles are mounted.

The spindle structure, as shown in Fig. 4, is organized about a stepped drive shaft 150 which is mounted for rotation in a plurality of anti-friction bearings 152 and 154 (see Fig. 5). At its inner end, the drive shaft 150 has splined thereto a cone-shaped clutch head 156, having teeth 158 adapted to engage corresponding teeth 160 of the hydraulic drive motor 144. The clutch head 156 is fixed to the drive shaft 150 by means of a key 162, such that the drive shaft 150 will be rotated whenever the clutch head 156 is rotated.

A brake spider 164 carries a friction annulus 166 externally of the clutch head 156 and in juxtaposition to a braking surface 168 of the journal structure 148. The brake disk 166 and its spider 164 are free to move in an axial direction and are normally somewhat spaced from the journal surface 168, but may be projected into braking contact with the surface by operation of a fluid pressure plunger 170, such that the drive shaft 150 may be brought to a controlled halt.

By reference to Figs. 4 and 5, it can be seen that the journal structure 148 has formed thereon a forwardly projecting sleeve 172 in which the ball bearing assemblies 152 are positioned. Inward movement of the ball bearing assemblies 152 is avoided by the shouldered junction of the sleeve 172 with the journal body 148, and movement of the bearing structures in the opposite direction is limited by a lock ring 174. Concentrically surrounding the sleeve 172 is a larger sleeve 176 which is mounted on the journal body 148 to form an annular chamber 178. Within the chamber 178 is an annular piston 180 which can be driven to the left, as viewed in Figs.

4 and 5, by admitting fluid under pressure to the chamber 178 from a suitable source by way of a fluid passage 182.

Splined to the free end of the drive shaft 150 is a spindle clutch head 184. The spindle clutch head 184 has an internal hub 186 which is adapted to embrace a reduced end of the drive shaft 150, the head being splined to the drive shaft such that it will rotate therewith. Inward movement of the clutch head 184 is limited by contact of complementary shoulders 188 in the shaft 150 and at the inner end of the hub 186. A flanged lock nut 190 is threaded onto the thread portion 192 of the drive shaft 150; a flange 194 of the lock nut being driven into contact with the face at the outer end of the hub 186.

At points circumferentially spaced about the wall of the head 184 is a plurality of ball seats 196, one of which is shown in Fig. 5. The ball seats 196 are adapted to receive reel hub locking balls 198 such that when the balls 198 are projected outwardly in a direction radial of the shaft axis, a sufficient circumference of the balls 198 will project beyond the wall of the head 184 to engage in corresponding flutes 28 in the reel hubs 16.

The projection of the balls 198 and the maintenance thereof in projected position is under control of a spring-pressed cam sleeve 200, mounted for limited reciprocating movement in an annular chamber 202, formed between the outer wall of the hub 186 and the inner wall of an outwardly spaced concentric annulus 204 of the head 184. The cam sleeve 200 is spring pressed into ball camming position by means of a heavy coil spring 206 which surrounds the hub 186 and bears at one of its ends against a face wall 208 of the head 184. The cam sleeve 200 has a pair of oppositely extending flanges 210 and 212 formed at the inner end thereof. These flanges serve to guide the cam sleeve 200 for reciprocation along the hub 189. The inwardly extending flange 212 also constitutes an abutment for the opposite end of the spring 206 while the outwardly extending flange 210 receives the thrust of the annular piston 180 when the same is forced forward under fluid pressure.

It can be seen from the foregoing that the spring 206 will urge the cam sleeve 200 to the right in Fig. 5 and that an inclined face 214 of the cam sleeve will contact the balls 198 and project them outwardly in a radial direction. Release of the balls 198 follows movement of the cam sleeve 200 to the left, as viewed in Fig. 5, and such movement is brought about by projecting the annular piston 180 against the outer face of the cam sleeve flange 210.

Extending forwardly from the face wall 208 of the head 184 is a plurality of wall members 216 which are spaced from each other by gaps 218. The wall members serve to mount a reel latching assembly 220. The reel latching assembly 220 comprises a pair of oppositely disposed plates 222 and 224, which form between them cavities for mounting a plurality of sliding reel dogs 226. The plates 222 and 224 are carried by and are spaced from each other by a disk member 228 which is mounted for slide movement on a reduced end 230 of the drive shaft 150. The disk 228 has a shaft surrounding hub 232 on which is mounted a bearing race 234.

Each reel latching dog assembly 226 consists of three members. Specifically, two assembly driving fingers 236 (only one shown) receive between them and have pivoted thereto a latching dog 238. Each of the reel latching assemblies 226 (of which there are three), shown in Fig. 5, is interconnected by a spring member 240 by means of which the latching assemblies are held in retracted position, such as shown in Fig. 4.

When the latch mounting assembly 220 is positioned at the outer end of the wall sections 216, as shown in Fig. 4, the tip of the reel latch 238 and the associated latch drivers 236 will be wholly within the head 184, and the inner ends of the drivers 236 will be in contact with an axially disposed surface 242 of the wall sections 216. However, if the entire assembly 220 is driven inwardly, the inner ends of the latch drivers 236 will travel along an inclined surface 244 of the wall sections 216, such that the drivers 236 together with the reel latch dog 238 will be driven outwardly in a radial direction through the gaps 218 between adjacent wall sections 216. The projected position of the latch and the drivers can be viewed in Fig. 5.

When the relative position of reel cartridge 10 and driving spindles 138 and 140 is changed from that of Fig. 4 to that of Fig. 5, the reel dogs 238 will engage the internal circumferential rib 30 of the reel hub structure. Continued reference to Fig. 5 will show that the balls 198 are seated in the flutes 28 formed internally of the reel hubs. The balls 198 in engagement with the flutes 28 of the reel serve to impart rotary motion to the reels whenever the drive shaft 150 is rotated, while the dogs 238 in engagement with the internal annular rib 30 of the reel hub will serve to maintain the reels axially located on the drive spindles, this position being determined by abutment of the reel flutes 28 with an upstanding shoulder 246 formed in the periphery of the head 184. Reference to Fig. 5 will also demonstrate that the cartridge carried spring 52 is effective to move the reel latch assembly 220 inwardly to its reel latching position.

In mounting the reels on their respective spindles, the cartridge 10 is moved toward the tape drive frame 142 with the axis of the reel hubs in alignment with the axis of their respective reel spindles. As the mounting movement proceeds, the shoulder 26 of the reel hub will engage the spindle rib 246 such that further axial movement of the reels is halted. Further movement of the reel cartridge 10 in an inward direction will serve to displace the reel cartridge case inwardly, while the reels remain stationary. This further movement of the reel cartridge case serves to disengage the fingers 42 from the teeth 38 of the gear 36, and also brings about disengagement of the friction annulus 40 and the confronting wall of the cartridge 10.

In the meantime the annular shoulder 54 of the spring hub 50 has engaged the anti-friction bearing assembly 234 carried by the disk 228 such that the reel latch assembly 220 is pushed inwardly as previously described. Continued movement of the reel cartridge case serves to compress the spring 52 until the disk 46 rests against the inner face of the cartridge wall. The initial position is that shown in Fig. 4, while the final position is that shown in Fig. 5. Continued reference to Fig. 5 will show that the friction annulus 40 is separated from the confronting wall 32 of the reel hub. Thus, the reels are now free to rotate within the cartridge 10.

The reel cartridge 10 is moved toward and away from the tape drive frame in any suitable manner, preferably, however, a reel cartridge loading mechanism such as that disclosed and claimed in the application for United States patent by Thomas U. Burke et al., Serial No. 741,543, filed June 12, 1958 will be employed.

The reel cartridges have laterally extending lugs 248 and 248a in one end wall of the cartridge as shown in Fig. 7, and an identical set of laterally extending lugs 250 and 250a extending from the other end wall of the cartridge, by means of which the cartridges can be engaged for movement to and away from the face of the tape transport unit such that the tape reels within the cartridges can be mounted upon and demounted from their respective reel driving spindles.

As noted above, the mechanism for engaging the studs 248—248a and 250—250a is disclosed in the aforesaid Burke et al. application, and only so much of that mechanism has been shown herein as is deemed necessary to render clear the cooperative function between the cartridge moving mechanism and the cartridges.

In Fig. 7 there is disclosed an end view of a pair of identical cartridge manipulating arms 252 and 254. These arms are telescopic structures such that they can be projected beyond the face panel of the tape transport unit to engage a tape reel cartridge located in aligned readiness for mounting upon the drive spindles of the transport unit. It may be presumed that a tape reel cartridge has been brought along a track 256 from some storage location and that it has been deposited upon the supporting track 258 at the face of the tape transport unit; which track consists of spaced sections 258*a*, 258*b* and 258*c*. By reference to Fig. 7, it will be noted that the caster assemblies 118 and 120 are of such proportions that the casters 126 and 128 thereof span the gap between the respective sections of the supporting track 258. It will be evident, therefore, that if the cartridge is slightly lifted to free the casters 126 and 128 of the track sections, the cartridge can be moved in an axial direction for mounting on the drive spindles of the tape transport unit. By the same token, after the tape within the cartridge has been proceessed, the cartridge can be released from the drive spindles of the tape transport mechanism for replacement on the track 258 or beyond said track to an outwardly spaced discharge track which may be associated with the tape transport unit, such that the cartridge may now be laterally moved to another track such as the track 256 for return to storage.

The axial movement of the cartridges is effected by controlled manipulation of the cartridge handling arms 252 and 254. Each of these arms includes a supporting and guiding rail 260 (see the arms 252 at the left in Fig. 7) which is capable of a limited tilting movement. Mounted on the supporting and guiding rail 260 is a slide 262 which rides on anti-friction bearings 264. The slide 262 has a bracket 266 attached to the forward end thereof; the bracket 266 being adapted to support a crosshead 268 having a pair of lug engaging socket members 270 and 272 at opposite ends thereof. The lug engaging socket members 270 and 272 have upwardly facing notches adapted to engage under the respective reel cartridge lugs 248 and 248*a*. The foregoing description is in particular reference to the cartridge manipulating arm at the left in Fig. 7, but the same applies with equal force to the cartridge engaging and manipulating arm 254 at the right in Fig. 7, wherein the same reference numerals distinguished by a subjoined "a" are applied to identify identical parts.

It can be seen, therefore, that the cartridge engaging and manipulating arms 252 and 254 can be driven to a forwardly projecting position and at the same time at a downward inclination wherein the lug engaging socket members 270 and 272 are below but in alignment with the respective lugs 248 and 248*a* of the tape reel cartridge. If the cartridge engaging and manipulating arms 252 and 254 are now tilted upwardly, they are caused to engage with their respective cartridge lugs 248—248*a* and 250—250*a*. Slight continued upward tilting movement of the arms 252 and 254 will free the caster assemblies 118 and 120 from the sections of the track 258 on which they are resting, such that the cartridge can be moved toward the drive spindles of the tape transport unit. It may be presumed that the position of the cartridge shown in Fig. 7 corresponds to that shown in Fig. 4.

In the description of Fig. 6, and particularly in the part thereof dealing with the latch 70 for latching the bottom cartridge closure 60, it was stated that a latch such as shown in Fig. 6 is located directly inside each reel cartridge end wall and that the operating pin 72 of these latches extends through elongated apertures 74 in the reel cartridge end walls.

Reference to Figs. 6 and 7 will show how the latch operating pins 72 are operated and how the bottom closure 60 of the cartridge is manipulated. As indicated in Fig. 7, the latch operating pins 72 project from the cartridge casing at a point slightly above and to the rear of the reel cartridge studs 248*a* and 250*a*. The cartridge stud sockets 272 and 272*a* each has an upper edge which is adapted to engage the pins 72 as the stud sockets make engagement with the cartridge studs 248*a* and 250*a*. As the pins 72 are so engaged, they are moved upwardly thereby releasing the internal latch mechanism, as previously described. As shown in Figs. 6 and 7, a pair of closure control bars 274 and 274*a* extend forwardly from the face of the tape drive frame and these bars carry a pair of laterally extending rods 276—278 and 276*a*—278*a* which are adapted to control movement of the cartridge closure 60. When the studs of the reel cartridge 10 are initially engaged by their stud sockets, the latch pins 72 will be engaged by the upper surface of the cartridge stud sockets 272 and 272*a*, but since in this position the closure 60 of the cartridge is over the pins 276 and 276*a*, the closure cannot open.

However, as a cartridge is moved inwardly by the slide mechanism, the closure 60 of the cartridge will open because at this point the cartridge is located between the pins 276—276*a* and 278—278*a* such that neither set of pins is an impediment to the free downward movement of the closure 60.

As the cartridge is moved inwardly toward the face of the tape frame following the opening of the closure 60, the upper edge of the closure will engage the pins 278—278*a* thereby swinging the closure 60 to a fully open position as inward movement of the cartridge continues (Fig. 6). By reference to Fig. 6, it will be seen that when the cartridge is in the loaded position, the closure 60 will be held open by the pins 278—278*a*. As the cartridge is being returned to the unloading position on track 258, the pins 276—276*a* will engage the bottom of the closure 60 and return it to its closed position in which position it will be latched as soon as the arms 252 and 254 are dropped away from the cartridge and the lugs and the latch operating pins are released thereby.

It has been stated previously that operation of the yoke 84 in Figs. 2 and 7 presents a length of tape 22 for easy threading between magnetic tape processing heads and tape guide surfaces on the face panel of the tape transport unit.

Figure 8:
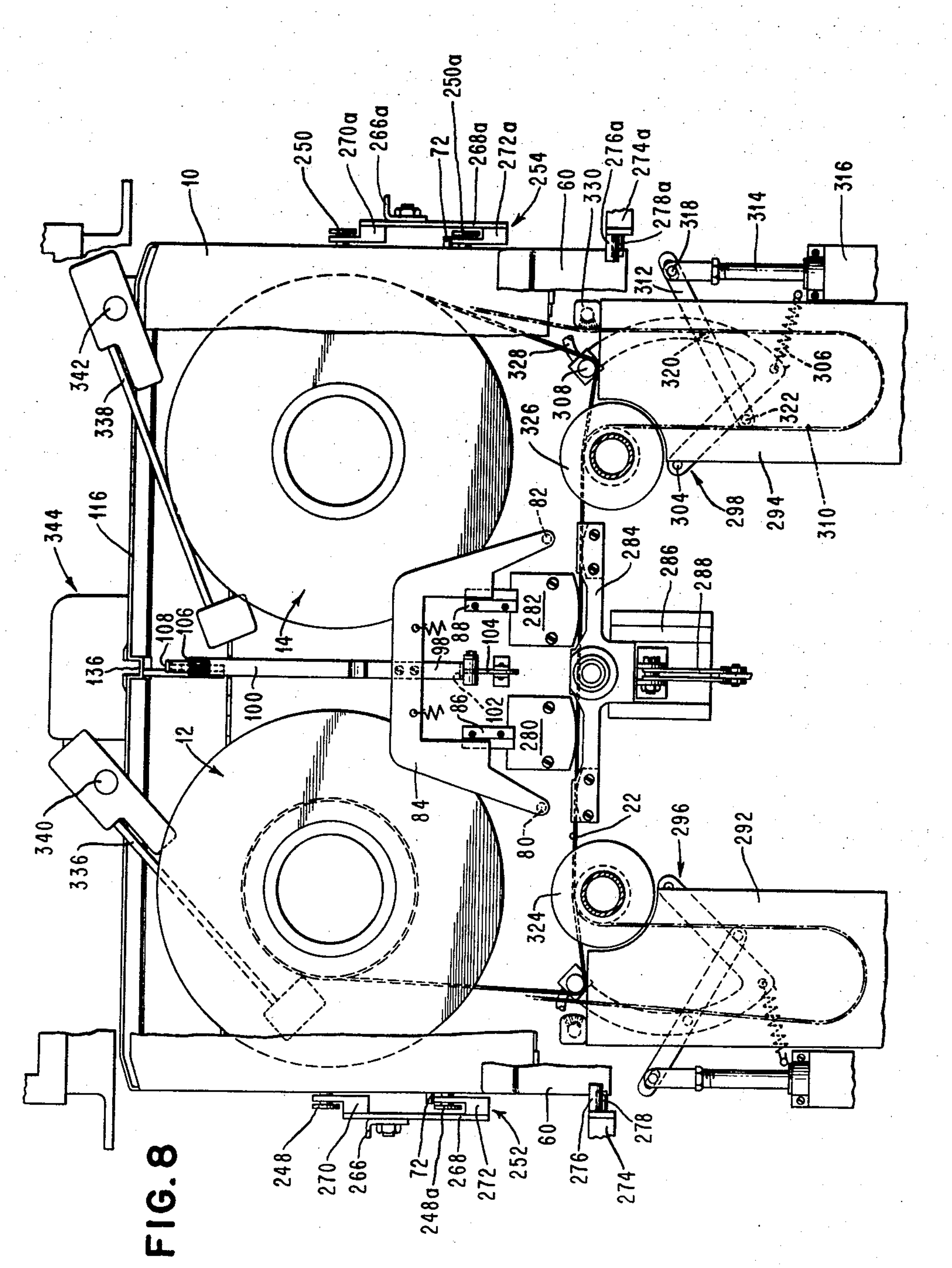
Fig. 8 is a view similar to that of Fig. 7 showing, however, the relationship between a record tape and tape threading mechanism during the tape threading operation.

Referring once again to Fig. 7 and also to Fig. 8, it will be seen that the tape transport unit has a pair of magnetic read/write heads 280 and 282 with which cooperates a tape guide plate 284. The tape guide plate 284 is mounted in a slide structure 286 and is controlled by a linkage system 288 under the influence of a fluid pressure cylinder-piston (not shown) which is connected thereto at the rear of the tape transport unit face panel; the linkage system 288 extending through an aperture 290 in said face panel. The specific nature of the read/write heads, the tape guide plate, and a complete understanding of its operating mechanism is of no importance insofar as the present invention is concerned, except to understand that operation of the linkage system 288 will serve to lower the tape guide plate 284 to the position shown in Fig. 7, such that the length of tape between the tape pins 80 and 82 carried by the yoke 84 will readily pass between the read/write heads 280 and 282 and the tape guide plate 284 and that further operation of the linkage system will then elevate the tape guide plate 284 into operative position as shown in Fig. 8.

The tape transport unit contemplated for the system herein is a modification of the tape transport machine disclosed and claimed in James A. Weidenhammer et al. application for United States patent, Serial No. 535,052, filed September 19, 1955, which is a continuation of Serial No. 290,396, filed May 26, 1952, and now abandoned. The tape transport unit of the present invention includes vacuum control columns of the nature disclosed and claimed in said Weidenhammer et al. application; these columns being a left vacuum column 292 and a right vacuum column 294, as shown in Figs. 7 and 8. When the tape transport unit is being conditioned for operation, the atmosphere in the columns 292 and 294 is exhausted through the bottom of the columns and the rarefied atmosphere within the columns is herein employed for threading the tape into the vacuum columns so that the entire operation of loading, threading and processing tape can be performed without manual intervention.

Tape threading mechanism is mounted in the face panel of the tape transport unit in association with each of the vacuum columns 292 and 294; this mechanism being adapted to position a length of the tape over the open upper mouth of each vacuum column whereby a loop of tape is drawn into each of the columns by reason of the difference in atmospheric pressure on opposite faces of the tape. Specifically, the mechanism includes a pair of tape threading segments 296 and 298, respectively, associated with the upper open end of the vacuum column 292 and 294. The form and operation of the tape threading segments are identical such that a description of the segment 298 associated with the vacuum column 294 will suffice as a description of both.

The tape threading segments, as seen by examination of the segment 298, consist of a generally arc-shaped portion 300 and a generally radial portion 302. The free end of the radial portion 302 is pivoted on a pivot pin 304 which permits the entire segment to swing from the position shown in Fig. 7 to that shown in Fig. 8. A spring 306 attached to the segment 298 at the juncture of the radial and arcuate sections rotates the segment in a clockwise direction (the segment 296 being mounted in a reverse position will rotate in a counter-clockwise direction). The segment 298 operates behind the vacuum column 294 but the free end of the arcuate portion 300 carries a forwardly projecting tube 308 which overlies the tape 22. As stated, the inner position of the segment 298, as shown in Fig. 7, is the position occupied thereby as a cartridge is loaded on the tape drive unit. It can be seen, therefore, that if the column loading segment is permitted to swing outwardly in a clockwise direction under the influence of the spring 306, the projecting tube 308 will engage the inner surface of the tape 22 and will carry a length of the tape across the upper open mouth of the vacuum column 294. When a length of tape is so positioned, a loop of tape, as shown in the dot-dash lines 310 (Fig. 8), will be drawn into the vacuum column.

The threading segment 298 is operated in a counterclockwise direction by means of a pivot lever 312 connected to the piston rod 314 of a fluid pressure cylinder 316; being connected thereto by a pin and slot connection 318. The lever 312 is pivoted on a pivot stud 320 and at its free end it carries a laterally projecting stud 322 which is in contact with the outer edge of the generally radial section 302 of the threading segment. When the piston rod 314 to which the pivot lever 312 is connected is withdrawn into its cylinder 316, the free end of the pivot lever 312 will be raised from the position shown in Fig. 8 to that shown in Fig. 7 with the result that the stud 322 bearing against the section 302 of the segment will swing the segment in a counterclockwise direction about its pivot point 320 and against the tension of the spring 306. During the tape threading operation fluid under pressure is admitted to the cylinder 316 with the result that the piston rod 314 will be projected as shown in Fig. 8 thereby dropping the free end of the pivot rod 312 and allowing the spring 306 to rock the segment 298 in a clockwise direction about its pivot 304.

As the tape 22 is carried across the open mouth of the vacuum columns 292 and 294 by operation of the threading segments 296 and 298, as described, it is simultaneously brought into contact with a pair of tape drive capstans 324 and 326 which are constantly driven in opposite direction. The capstans 324 and 326 provide the motive force for driving the tape in a selected direction in respect to the read/write heads 280 and 282. Suitable means, forming no part of this invention, have been provided for selectively engaging the tape 22 with either the capstan 324 or 326, whereby drive of tape and its direction is controlled.

The tube 308 carried by the threading segment 298 is a hollow tube having a plurality of perforations in the wall thereof which faces the tape and the tube is connected by means of a flexible conduit 328 with a source of air under pressure. Whenever the tube 308 is in operative relation to the tape and air is discharged through the perforations of the tube, there will be formed an air film between the tube surface and the confronting face of the tape thereby friction that might otherwise be present is eliminated. By the same token, the top of each tape column has a tape guide 330 located at the outer edge thereof. This tape guide has a perforated inner face and is connected to a source of air under pressure whereby an air film is formed between the opposite face of the tape and the confronting face of the tape guide 330.

The position of the tape loops within the vacuum columns 292 and 294 effectively controls the motion of the tape drive spindles, as taught in the aforesaid Weindenhammer et al. application for patent, such that a loop of tape of optimum length is maintained in the vacuum columns 292 and 294, providing a reservoir of relatively slack tape upon which the tape drive capstans 324 and 326 may draw without regard to any inertia inherent in the reel drive mechanism.

Fig. 8 also discloses that the top closure section 112 of the cartridge has been opened. The manner in which the cartridge top section 112 is opened has been alluded to heretofore, particularly in the description of Fig. 6 wherein it was briefly stated that a lever 104 is operated to elevate the operating rod 96 by which the top section 112 of the cartridge is swung to its open position. Reference to Fig. 6 will show that the lever 104 is rotatable about a pivot 332 and that an arm 334 of the lever 304 extends to the rear of the tape drive face panel 146. The rearwardly extending arm 334 is connected to a piston (not shown) operating in a fluid pressure cylinder (not shown). It can be seen, therefore, that as the piston is withdrawn into its cylinder, the lever 334 will be rocked upwardly such that the yoke 84 and the rod 100 are elevated. Projection of the piston will reversely rock the lever 334, so that the yoke 84 and the rod 100 will be lowered under the influence of the springs attached thereto.

After the covered section 112 of the cartridge is opened, a pair of coil sensing arms 336 and 338 (Fig. 8) pivoted respectively on pivot pins 340 and 342 are lowered into the cartridge through the now opened top and are positioned in proximity to the tape coils on the reels within the cartridge. The arms 336 and 338 constitute elements of a photosensitive control mechanism which forms no part of the invention claimed herein. It is sufficient to state that the size of the tape coil on the respective reels is sensed thereby and that the position of the arms 336 and 338 controls a servo system 344 which system controls the speed of the reel drive spindles to maintain it proportional to the size of the tape coil on the respective reels.

Since the yoke 84 is normally in its depressed position and the tape guide pins 80 and 82 engage the upper surface of the tape, the length of tape 22 between the guide pins 80 and 82 will ordinarily be relatively taut, such that there is no difficulty in threading the tape between the tape guide 284 and the read/write heads 280 and 282. However, to guard against any slackness in the tape, there has been provided a pair of spring biased fingers 346 and 348 which are adapted to engage and lift the tape, thereby taking up any slack in the length of tape between the two reels within the tape cartridge. Furthermore, these spring biased fingers effectively hold portions of the tape laterally beyond the tape guide pins 80 and 82 in an elevated position so that the tape will encounter no interference from the tape drive capstans 324 and 326 as the tape threading operation proceeds. Moreover, elevation of the tape by the spring biased fingers 346 and 348 so positions the tape that the tape threading tubes 308 will invariably engage the tape properly for threading the same across the ends of the vacuum columns 292 and 294.

Specifically, the spring biased fingers 346 and 348 are disclosed in some detail in Figs. 1 and 2, wherein it will be seen that the forward wall of the tape cartridge has a pair of supporting brackets 350 and 352 attached thereto and depending downwardly at the area of the hinge 62, one of the brackets being respectively located outward laterally from each of the tape guide pins 80 and 82. Pivoted upon the brackets 350 and 352 by means of pivot pins 354 and 356 are the spring biased fingers 346 and 348 above referred to. These fingers are biased by their respective springs 358 and 360, which springs are coiled about the pivot pins 354 and 356 respectively, one end of the spring being turned over to engage the inner edge of the respective fingers.

The normal position of the fingers 346 and 348 is shown in Fig. 1 of the drawings, wherein it can be seen that laterally extending extremities 362 and 364 of the fingers underlie the tape 22 (see also Fig. 3). In the normal position of Fig. 1, the fingers 346 and 348 are urged about their respective pivots to raise the laterally extending extremities 362 and 364 thereof. The finger 346 is urged about its pivot in a clockwise direction, while the finger 348 is urged about its pivot in a counterclockwise direction. It will be seen, therefore, that the laterally extending extremities 362 and 364 of the respective fingers in effect cooperate with the tape guide pins 80 and 82 respectively, such that the length of tape 22 between the tape guide pins 80 and 82 is held under at least a degree of tension such that there is no sag that would tend to foul the tape in associated mechanism as the tape is being threaded in reference to the read/write heads 280 and 282.

After the threading operation has been successfully accomplished, the operating lever 104 is manipulated as above described, thereby elevating the yoke 84, with the result that the tape guide pins 80 and 82 are carried upwardly. By reference to both Figs. 1 and 2, it will be seen that the tape guide pins 80 and 82 extend laterally across the plane of rotation of the free ends of the fingers 346 and 348, such that when the tape guide pins 80 and 82 are elevated, they will engage the inner edges of the fingers 346 and 348 and rotate the fingers about their pivot pins from the position shown in Fig. 1 to that shown in Fig. 2. When the fingers 346 and 348 are rotated into the position of Fig. 2, they are relatively inoperative. However, if there is a substantial amount of slack in the tape 22, the tape will be supported by the inturned legs of the lever to avoid such degree of sag therein as to cause the tape to become entangled with any of the drive mechanism with which it is associated.

While the fundamentally novel features of the invention have been illustrated and described in connection with a specific embodiment of the invention, it is believed that this embodiment will enable others skilled in the art to apply the principles of the invention in forms departing from the exemplary embodiment herein, and such departures are contemplated by the claims.

What is claimed is:

1. In a tape reel cartridge including a top wall, a bottom wall, a pair of end walls and a pair of side walls constituting an enclosure for a pair of tape reels, a pair of reel hub apertures in one of said side walls, means within said cartridge operatively associated with each of said apertures for releasably securing tape reels with their axes coincident respectively with the axes of said apertures, external caster wheels fixed to a wall of said cartridge whereby said cartridge is adapted for movement along a guideway, and external engaging means formed in a wall of said cartridge for interengagement with cartridge propelling mechanism.

2. In a tape reel cartridge including a top wall, a bottom wall, a pair of end walls and a pair of side walls constituting an enclosure for a pair of tape reels, a pair of reel hub apertures in one of said side walls, means within said cartridge operatively associated with each of said apertures for releasably securing tape reels with their axes coincident respectively with the axes of said apertures, external caster wheels fixed to said top wall of said cartridge whereby said cartridge is adapted for suspension from and movement along a guideway, and a transverse slot formed in said top wall of said cartridge for interengagement with cartridge propelling mechanism.

3. In a tape reel cartridge including a top wall, a bottom wall, a pair of end walls and a pair of side walls constituting an enclosure for a pair of tape reels, a pair of reel hub apertures in one of said side walls, means within said cartridge operatively associated with each of said apertures for releasably securing tape reels with their axes coincident respectively with the axes of said apertures, a tape access aperture at the bottom of said side wall having said reel hub apertures therein, a pair of laterally spaced pins within said cartridge extending transversely above the path of tape between a pair of tape reels in said cartridge, slidable mounting means for said pins whereby said pins can be moved downwardly to hold a length of tape within said access aperture, and spring means for normally holding said mounting means with the pins thereof in tape engaging position.

4. In a tape reel cartridge including a top wall, a bottom wall, a pair of end walls and a pair of side walls constituting an enclosure for a pair of tape reels, a pair of reel hub apertures in one of said side walls, means within said cartridge operatively associated with each of said apertures for releasably securing tape reels with their axes coincident respectively with the axes of said apertures, a tape access aperture in one of said side walls, a pair of laterally spaced tape engaging means located in a common horizontal plane within said cartridge and extending transversely above the normal path of tape between a pair of tape reels in said cartridge adapted to depress a length of tape below said normal path of tape and thereby maintain a length of tape in said access aperture, mounting means for said pins, and means for withdrawing said tape engaging means out of engagement with said tape.

5. In a tape reel cartridge including a top wall, a bottom wall, a pair of end walls and a pair of side walls constituting an enclosure for a pair of tape reels, a pair of reel hub apertures in one of said side walls, means within said cartridge operatively associated with each of said apertures for releasably securing tape reels with their axes coincident respectively with the axes of said apertures, a tape access aperture in one of said side walls, a pair of laterally spaced pins located in a common horizontal plane within said cartridge and extending transversely above the normal path of tape between a pair of tape reels in said cartridge, spring biased slidable mounting means for said pins adapted to maintain said pins in tape engaging position within said access aperture whereby said pins depress a length of tape below said normal path of tape and thereby maintain a length of tape in said access aperture, and means for retracting said mounting means and releasing a tape engaged by the pins thereof.

6. In a tape reel cartridge including a top wall, a bottom wall, a pair of end walls and a pair of side walls constituting an enclosure for a pair of tape reels, a pair of reel hub apertures in one of said side walls, means within said cartridge operatively associated with each of said apertures for releasably securing tape reels with their axes coincident respectively with the axes of said apertures, a tape access aperture at the bottom of said side wall having said reel hub apertures therein, a pair of laterally spaced tape engaging fingers within said cartridge extending transversely below the path of tape between a pair of tape reels in said cartridge, spring means for biasing said fingers into tape engaging position, and means for moving said fingers against the bias of said spring means for retracting said fingers from tape contacting position.

7. In a tape reel cartridge including a top wall, a bottom wall, a pair of end walls and a pair of side walls constituting an enclosure for a pair of tape reels, a pair of reel hub apertures in one of said side walls, means within said cartridge operatively associated with each of said apertures for releasably securing tape reels with their axes coincident respectively with the axes of said apertures, a tape access aperture at the bottom of said side wall having said reel hub apertures therein, a pair of laterally spaced pivoted tape engaging fingers within said cartridge extending transversely below the path of tape between a pair of tape reels in said cartridge, spring means associated with each of said fingers for pivoting the same into tape engaging position, and slidable means associated with said fingers adapted to rotate said fingers against the bias of said spring means for retracting said fingers from tape contacting position.

8. In a tape reel cartridge including a top wall, a bottom wall, a pair of end walls and a pair of side walls constituting an enclosure for a pair of tape reels, a pair of reel hub apertures in one of said side walls, means within said cartridge operatively associated with each of said apertures for releasably securing tape reels with their axes coincident respectively with the axes of said apertures, a hinged panel at the bottom of said side wall having said reel hub apertures, means for latching said panel in cartridge closing position, and means extending to the exterior of said cartridge for releasing said latching means to open said panel and provide access to a length of tape extending between a pair of tape reels within said cartridge.

9. In a tape reel cartridge including a top wall, a bottom wall, a pair of end walls and a pair of side walls constituting an enclosure for a pair of tape reels, a pair of reel hub apertures in one of said side walls, means within said cartridge operatively associated with each of said apertures for releasably securing tape reels with their axes coincident respectively with the axes of said apertures, a hinged panel at the bottom of said side wall having said reel hub apertures, a latch within said cartridge for latching said panel in cartridge closing position, and latch release means extending to the exterior of each of said end walls of said cartridge for releasing said latching means upon engagement with cartridge manipulating mechanism to open said panel and provide access to a length of tape extending between a pair of tape reels within said cartridge.

10. In a tape reel cartridge including a top wall, a bottom wall, a pair of end walls and a pair of side walls constituting an enclosure for a pair of tape reels, a pair of reel hub apertures in one of said side walls, means within said cartridge operatively associated with each of said apertures for releasably securing tape reels with their axes coincident respectively with the axes of said apertures, a panel at the bottom of one of said side walls, means at the bottom of said panel for hinging the same to said cartridge whereby said panel is adapted to open by gravity, means for latching said panel in cartridge closing position, and means extending to the exterior of each of said end walls of said cartridge for releasing said latching means upon engagement with cartridge manipulating mechanism to open said panel and provide access to a length of tape extending between a pair of tape reels within said cartridge.

11. In a tape reel cartridge including a top wall, a bottom wall, a pair of end walls and a pair of side walls constituting an enclosure for a pair of tape reels, a pair of reel hub apertures in one of said side walls, means within said cartridge operatively associated with each of said apertures for releasably securing tape reels with their axes coincident respectively with the axes of said apertures, a panel at the bottom of one of said side walls, means at the bottom of said panel for hinging the same to said cartridge whereby said panel is adapted to open by gravity, a latch within said cartridge for latching said panel in cartridge closing position, and latch release means extending to the exterior of each of said end walls of said cartridge for releasing said latching means upon engagement with cartridge manipulating mechanism to open said panel and provide access to a length of tape extending between a pair of tape reels within said cartridge.

12. In a tape reel cartridge including a top wall, a bottom wall, a pair of end walls and a pair of side walls constituting an enclosure for a pair of tape reels, a pair of reel hub apertures in one of said side walls, means within said cartridge operatively associated with each of said apertures for releasably securing tape reels with their axes coincident respectively with the axes of said apertures, a hinged panel in one of said side walls, means at the bottom of said panel for hinging the same to said cartridge whereby said panel is adapted to open by gravity, a latch for maintaining said panel in cartridge closing position, and latch release means adapted for engagement by cartridge manipulating mechanism extending to the exterior of said cartridge for releasing said latching means to open said panel and provide access to a length of tape extending between a pair of tape reels within said cartridge.

13. In a tape reel cartridge including a top wall, a bottom wall, a pair of end walls and a pair of side walls constituting an enclosure for a pair of tape reels, a pair of reel hub apertures in one of said side walls, means within said cartridge operatively associated with each of said apertures for releasably securing tape reels with their axes coincident respectively with the axes of said apertures, a tape access aperture in a wall of said enclosure, a hinged panel normally closing said access aperture, means extending from said cartridge end walls for interengagement with cartridge manipulating mechanism, and panel release means extending from said cartridge end walls in proximity to said interengagement means whereby said panel release means is operatively accessible to cartridge manipulating mechanism upon interengagement thereof with said interengagement means.

References Cited in the file of this patent

UNITED STATES PATENTS

| | | |
|---|---|---|
| 1,520,444 | Romadka | Dec. 23, 1924 |
| 1,666,652 | Hiering | Apr. 17, 1928 |
| 1,735,183 | Salerno | Nov. 12, 1929 |
| 2,499,895 | Walker | Mar. 7, 1950 |
| 2,584,733 | Owens | Feb. 5, 1952 |
| 2,612,565 | Heller | Sept. 30, 1952 |
| 2,702,834 | Golle et al. | Feb. 22, 1955 |
| 2,778,880 | Eash | Jan. 22, 1957 |